(12) United States Patent
Yanata

(10) Patent No.: US 6,217,455 B1
(45) Date of Patent: Apr. 17, 2001

(54) DRIVING SHAFT

(75) Inventor: Ryoji Yanata, Kawagoe (JP)

(73) Assignee: Matsui-Walterscheid Ltd., Tokyo (JP)

( * ) Notice: Subject to any disclaimer, the term of this patent is extended or adjusted under 35 U.S.C. 154(b) by 0 days.

(21) Appl. No.: 09/191,792

(22) Filed: Nov. 13, 1998

(30) Foreign Application Priority Data

Nov. 18, 1997 (JP) .................................................. 9-317185

(51) Int. Cl.$^7$ ...................................................... F16D 3/26
(52) U.S. Cl. .............................. 464/113; 464/7; 464/179; 464/183
(58) Field of Search .............................. 464/7, 179, 183, 464/113; 285/328, 125.1, 136.1, 143.1

(56) References Cited

U.S. PATENT DOCUMENTS

| | | | |
|---|---|---|---|
| 3,105,370 | * | 10/1963 | Weasler ...................................... 464/7 |
| 5,173,082 | * | 12/1992 | Bondioli ..................................... 464/7 |
| 5,366,043 | * | 11/1994 | Kretschmer et al. ...................... 464/7 |
| 5,538,474 | * | 7/1996 | Kretschmer et al. ................... 464/162 |

FOREIGN PATENT DOCUMENTS

| | | | |
|---|---|---|---|
| 19712158 | | 10/1998 | (DE) . |
| 0916856A2 | * | 5/1999 | (EP) ..................................... 464/162 |

OTHER PUBLICATIONS

Patent Abstracts of Japan, vol. 1997, No. 2, Feb. 28, 1997, JP 08 254217 A (Matsui), Oct. 1, 1996.

Patent Abstracts of Japan, vol. 1997, No. 2, Feb. 28, 1997, JP 08 254216A (Matsui), Oct. 1, 1996.

* cited by examiner

Primary Examiner—Lynne H. Browne
Assistant Examiner—Aaron Dunwoody
(74) Attorney, Agent, or Firm—Baker Botts L.L.P.

(57) ABSTRACT

A driving shaft (3) includes an inner tube (1) and an outer tube (2) having a modified cross-section. These tubes (1, 2) are axially movable but not rotatable relative to each other for transmitting torque therebetween. The driving shaft (3) comprises a partition unit having a pair of partition walls (8a, 8b; 16) hermetically sealing at least part of the inside of the inner tube to define a grease reserving space (8A) in the inner tube on the side of its distal end. The partition wall (8a, 16) on the side of its proximal end is provided with a hose mounting portion (8c; 23) having an oil hole (9). The driving shaft (3) further comprises an oiling port unit (10; 20) provided on a fitting yoke (7) on the side of the proximal end of the inner tube and an oiling conduit unit (11; 24, 25) for connecting the oiling port unit (10; 20) and the hose mounting portion (8c; 23) of the partition unit. The driving shaft further comprises a distribution passage unit (13, 14; 14) for distributing grease from the grease reserving space (8A) to the sliding surfaces of the tubes (1, 2) participating in torque transmission. With this construction, the grease is surely supplied to the portions (12) participating in torque transmission of the driving shaft (3) without requiring frequent grease supply. Moreover, there is no risk of the oiling hose from being unintentionally removed from the fixed position.

12 Claims, 5 Drawing Sheets

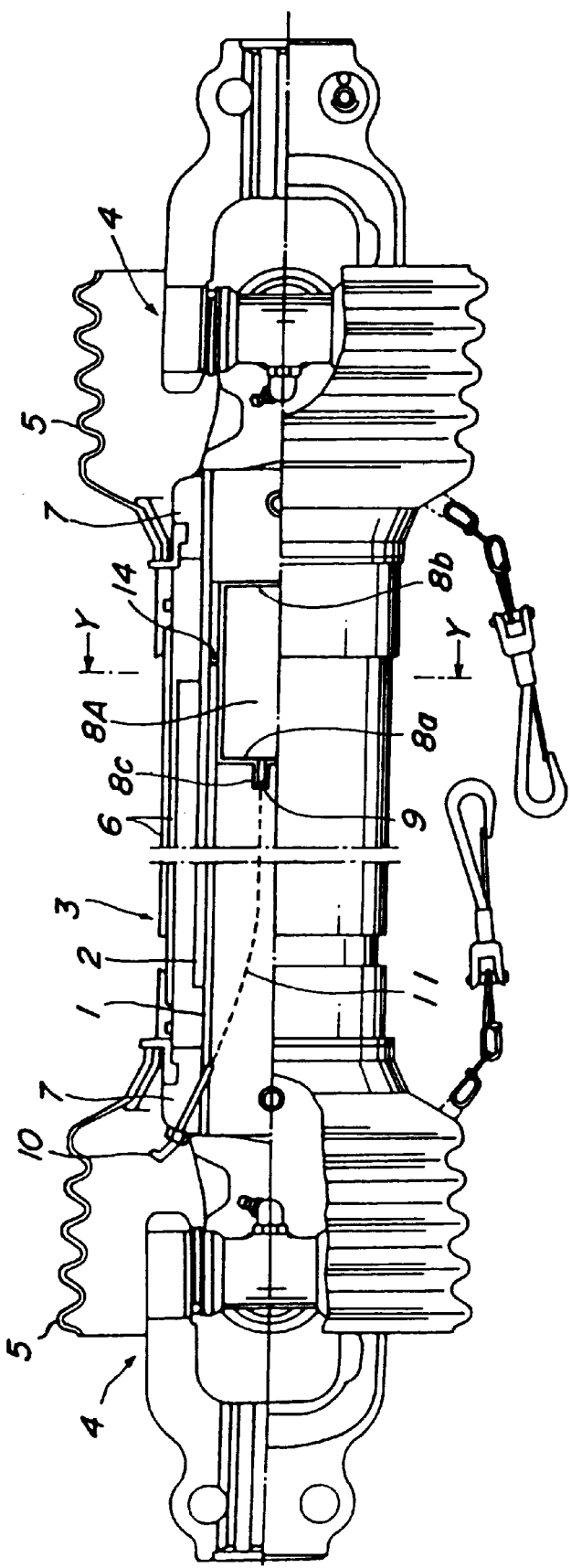
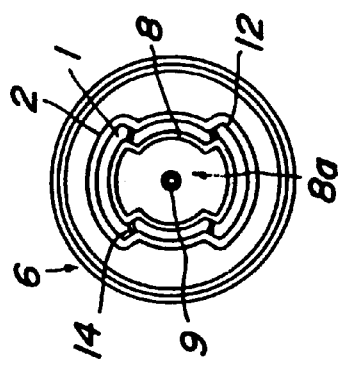
FIG_1a
FIG_1b

DRIVING SHAFT

This invention relates to a driving shaft having an inner and an outer tube axially movable but not rotatable relative to each other for transmitting torque therebetween, and more particularly to an improved lubrication of sliding surfaces of the inner and outer tubes.

Such a driving shaft and more particularly the lubrication of sliding surfaces of inner and outer tubes of driving shafts have been disclosed in Japanese Patent Application Opened No. H5-312,219 (1993) which is the prior application of the applicant of the present application.

In the driving shaft disclosed in the Japanese Patent Application Opened No. H5-312,219, for the purpose of lubricating the sliding surfaces of the inner and outer tubes, a grease nipple is provided at the end of the inner tube adjacent the universal joint and connected to grease outlet means provided on the inner tube.

With such a driving shaft disclosed in the prior application, its principal object is to feed grease to sliding surfaces of the inner and outer tubes having a lemon-shaped cross-section. In order to supply the grease to the sliding surfaces continuously, it is needed to inject grease frequently into the grease nipple provided at the end of the inner tube adjacent the universal joint.

With the disclosed driving shaft, moreover, particularly using tubes of a modified, complicated cross-section, for example, butterfly-shaped cross-section, the driving shaft suffers several disadvantages from recessed inclined surfaces participating in torque transmission, which may cause insufficient and unreliable supply of grease.

With the disclosed driving shaft, furthermore, there is a problem in fixing an oiling hose to the inner tube, in that the oiling hose generally tends to be unintentionally detached from its fixed position.

It is therefore an object of the invention to provide a driving shaft making it possible to supply grease to the portions participating in torque transmission with great certainty without frequent supply of grease and to prevent an oiling hose from being unintentionally removed from its fixed position.

In order to achieve this object, the driving shaft according to the invention characterized in that said driving shaft comprises partition means including a pair of partition walls situated on the sides of the proximal and distal ends of the inner tube hermetically sealing at least the inside of the inner tube to define a grease reserving space for grease and a hose mounting portion having an oil hole provided on said partition wall on the side of the proximal end; oiling port means provided on a fitting yoke on the side of the proximal end of the inner tube; oiling conduit means connecting said hose mounting portion of said partition means and said oiling port means; and distribution passage means for distributing the grease from said grease reserving space to the portions of sliding surfaces of said inner and outer tubes which participate in torque transmission.

With this construction according to the invention, the grease reserved in the grease reserving space is supplied from the partition means through the distribution passage means to the sliding surfaces of the inner and outer tubes participating in torque transmission for a long period of time, thereby reducing the thrust or frictional resistance and noise when rotating and considerably prolonging the service life of the driving shaft.

In a preferred embodiment of the invention, the partition means comprises a container made of a plastic material having a cross-section of a similar figure to that of said inner tube and a size to be fitted in said inner tube by press-fitting, and said hose mounting portion is an elongated projection extending from said partition wall on the side of the proximal end of the inner tube toward said proximal end, and wherein said distribution passage means comprises a plurality of elongated grooves extending in the longitudinal direction of said container and formed in the side wall of said container corresponding to the shaped portions of said inner tube participating in torque transmission, and a plurality of through-holes formed in said inner tube to communicate with said elongated grooves. With this construction, the grease reserving space is advantageously provided only by inserting the container into the distal end of the inner tube, thereby simplifying the assembling of the driving shaft.

In this embodiment, if the container is formed so as to be slightly tapered in its longitudinal direction, the insertion of the container into the inner tube becomes easier and an unintentional removal of the container from the inner tube can be prevented. Moreover, if the container is provided with at least one annular protrusion on its outer circumference, the fixation of the container in the inner tube becomes more reliable with the aid of the frictional engagement of the annular protrusion.

In another preferred embodiment of the invention, the partition means comprises a pair of partition walls press-fitted in said inner tube, and said distribution passage means comprises a plurality of through-holes formed in said inner tube at its shaped portions participating in torque transmission. With this construction, there is no need for preparing a container to form a grease reserving space. If the partition walls are made of a plastic material, they can be more easily press-fitted into the inner tube and become more inexpensive.

In a further preferred embodiment of the invention, the oiling port means comprises an inlet side hose support which is able to be fixed to said fitting yoke supporting the proximal end of said inner tube and has an oiling protrusion, a hose receiving recess and an oiling passage communicating said oiling protrusion with said hose receiving recess, and said hose mounting portion comprises an outlet side hose support which is able to be fixed to said partition wall on the side of the proximal end and has a hose receiving recess and an oiling passage communicating said hose receiving recess with said grease reserving space, and wherein said oiling conduit means comprises a hose whose both ends are to be inserted into said hose receiving recesses of said inlet and outlet side hose supports, respectively and having radially extending flanges, respectively, and hose fixing plugs which are able to be fixed in said hose receiving recesses of said inlet and outlet side hose supports, respectively, for fixing said both ends of the hose in said receiving recesses, respectively. With this construction, the unintentional removal of the hose from its fixed position can be surely prevented.

In this embodiment, each of said flanges at both the ends of said hose is provided on its end face with an annular protrusion or annular recess, while each of said hose supports is correspondingly provided in the bottom face of the hose receiving recess with an annular recess or annular protrusion engaging said annular protrusion or annular recess. With this construction, the sealing between the hose and the oiling passage becomes improved.

The invention will be more fully understood by referring to the following detailed specification and claims taken in connection with the appended drawings.

BRIEF DESCRIPTION OF THE SEVERAL VIEWS OF THE DRAWINGS

FIG. 1a is a partly sectional side view illustrating a preferred embodiment of the driving shaft according to the invention;

FIG. 1b is a sectional view taken along line Y—Y in FIG. 1a;

FIG. 2a is a side view of a container as partition means defining the grease reserving space in the driving shaft shown in FIG. 1a;

FIG. 3b is a sectional view taken along line Y—Y in FIG. 3a;

FIG. 4a is a schematic sectional view of the inlet side hose support as oiling port means of the driving shaft shown in FIG. 3a;

FIG. 4b is a schematic sectional view of the outlet side hose support as the hose mounting portion of the partition means of the driving shaft shown in FIG. 3a;

FIG. 4c is a schematic sectional view of the hose and the hose fixing plug mounted on the hose as the oiling conduit means of the driving shaft shown in FIG. 3a.

DETAILED DESCRIPTION OF THE EMBODIMENT

Figure 2A:
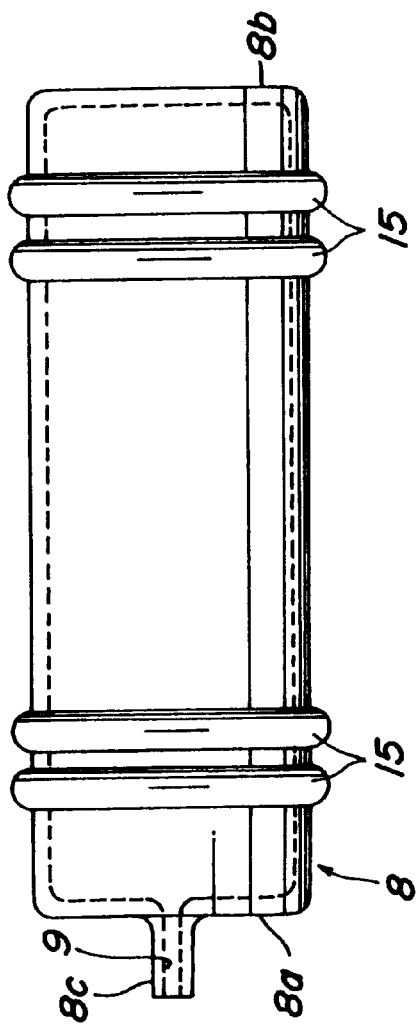

FIG. 1 illustrates a driving shaft according to the invention comprising an inner tube 1 and an outer tube 2 having a modified cross-section in the form of a butterfly, which are axially movable but not rotatable relative to each other for transmitting torque through these tubes 1 and 2. The driving shaft 3 further comprises two universal joints 4 provided at the ends and safety covers 5 in the form of bellows surrounding the universal joints 4, respectively. Moreover, the inner and outer tubes 1 and 2 are covered by safety cover tubes 6 and have proximal ends fixed to fitting yokes 7 of the universal joints 4, respectively.

According to the embodiment of the driving shaft shown in FIG. 1, in order to form a grease reserving space 8A in the inner tube 1 at its distal end for reserving an amount of grease, press-fitted into the inner tube 1 is a plastic container 8 as partition means having a cross-section of a similar figure to that of the inner tube. The plastic container 8 includes a pair of partition walls 8a and 8b situated on the sides of the proximal and distal ends of the tube 1, respectively, for hermetically sealing the inside of the inner tube 1 and a hose fitting 8c having an oil hole 9 provided on the partition wall 8a on the side of the proximal end. The hose fitting 8c as hose mounting portion is formed on the partition wall 8a on the side of the proximal end so as to extend toward the proximal end to ensure the fixation of a hose to the hose fitting 8c by press-fitting.

A hose 11 as oiling conduit means serves to connect a nipple 10 as oiling port means provided at the fitting yoke 7 on the side of the proximal end of the inner tube 1 and the hose fitting 8c extending toward the proximal end from the partition wall 8a of the plastic container wall 8 or partition wall means. The hose 11 may be made of, for example, a plastic material, copper or steel.

In the case of the tubes 1 and 2 having the modified cross-section in the form of a butterfly as shown in FIG. 1, the inclined portions 12 of four recessed parts participate in the torque transmission at the sliding surfaces of the inner and outer tubes 1 and 2. In order to distribute the grease from the grease reserving space 8A to the inclined portions 12 between the inner and outer tubes 1 and 2 participating in the torque transmission, distribution passage means is provided which comprises a plurality of elongated grooves 13 (FIG. 2c) extending in the longitudinal direction of the container 8 and formed in its side walls corresponding to the portions participating in the torque transmission, and a plurality of through-holes 14 formed in the inner tube 1 so as to communicate with the elongated grooves 13.

Figure 2C:
FIG. 2c is a partial plan view illustrating the elongated groove formed in the container corresponding to the portion of the inner tube participating in torque transmission.
Figure 2B:
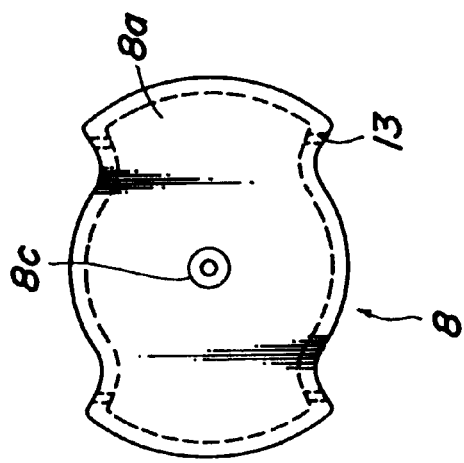
FIG. 2b is an end view of the container shown in FIG. 2a on the side of the proximal end of the inner tube.

As shown on FIG. 2, the container 8 may be formed so as to be slightly tapered in its longitudinal direction, thereby facilitating to fit it into the inner tube 1 by press-fitting and preventing it from being dislodged from the inner tube 1. Moreover, the container 8 may be provided with at least one annular protrusion 15, four protrusions in the shown embodiment, on its outer circumference for more ensuring the fixation of the container into the inner tube 1 by press-fitting.

Figure 3A:
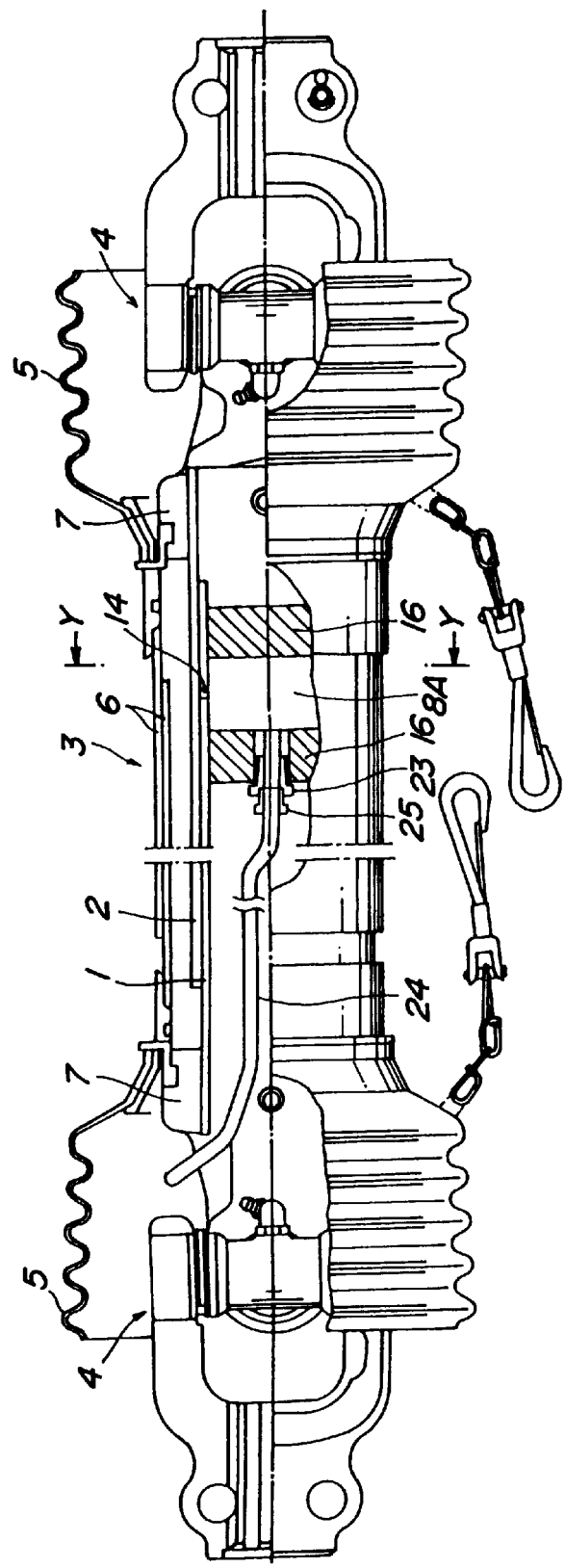
FIG. 3a is a partly sectional side view illustrating another preferred embodiment of the driving shaft according to the invention.
Figure 3C:
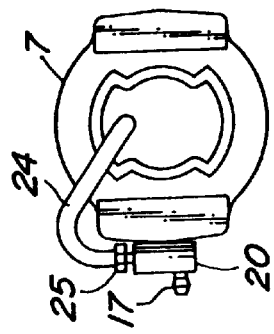
FIG. 3c is a schematic view of the oiling conduit means in the driving shaft shown in FIG. 3a as viewed from the proximal end of the inner tube.
Figure 3B:
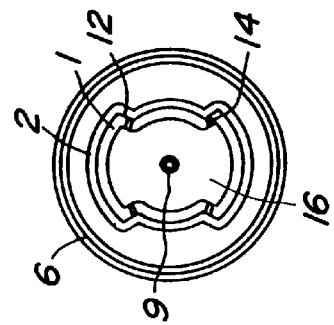

FIG. 3 illustrates another embodiment of the driving shaft according to the invention. In this embodiment, partition wall means is constructed by a pair of partition walls 16 press-fitted in the inner tube 1, and distribution passage means is composed of a plurality of through-holes 14 formed in the inner tube 1 at the locations corresponding to the portions participating in the torque transmission. These partition walls are preferably made of a plastic material with low cost, but they may be made of a copper alloy or aluminum alloy.

Figure 4A:
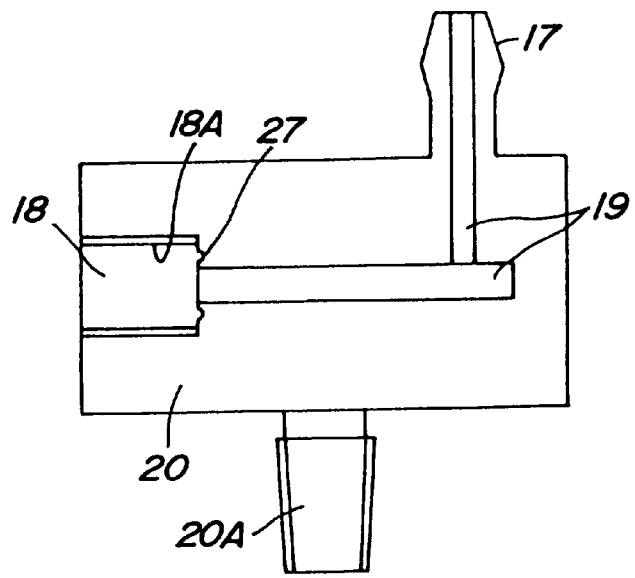
Figure 5:
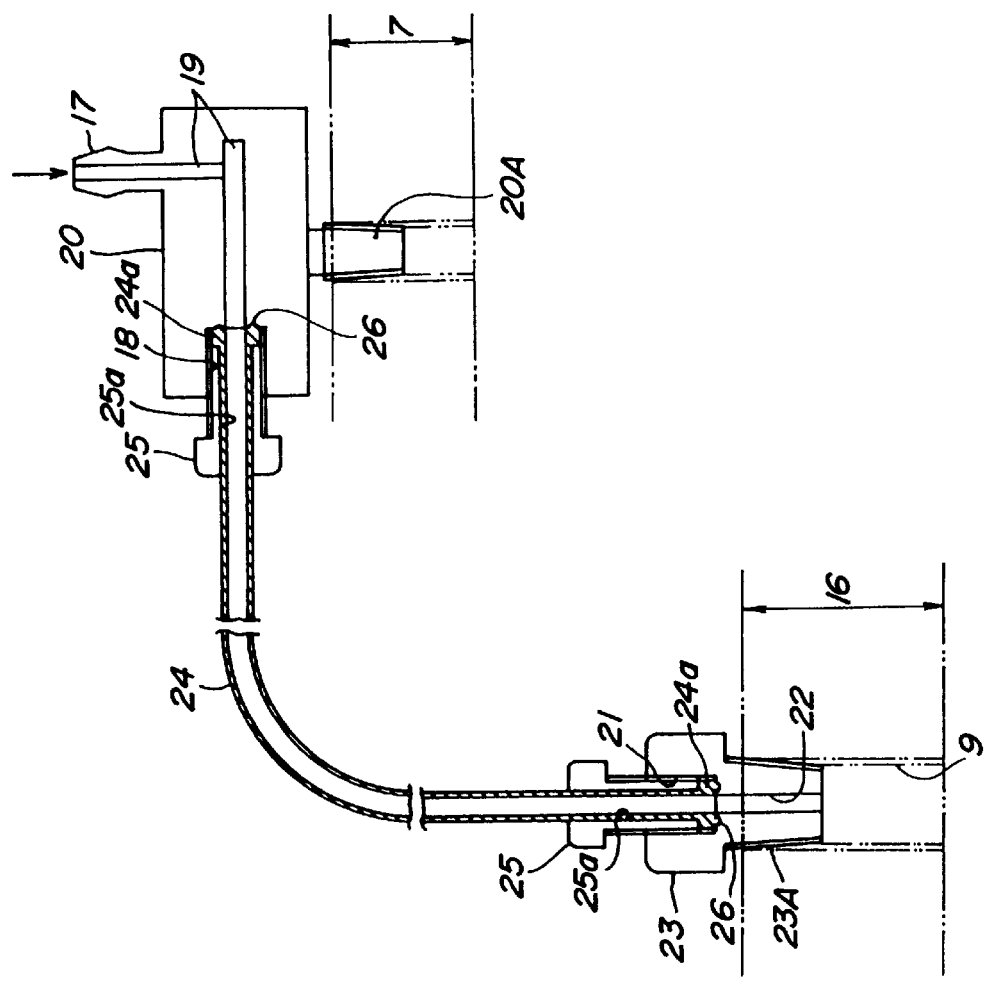
FIG. 5 is a schematic explanatory view of the hose fixed with its ends to the inlet and outlet side hose supports by means of the hose fixing plugs of the driving shaft shown in FIG. 3.

In the embodiment shown in FIG. 3, oiling port means is composed of an inlet side hose support 20 adapted to be fixed to the fitting yoke 7 supporting the proximal end of the inner tube 1 as shown in FIG. 5. The inlet side hose support 20 is formed with an oiling protrusion 17, a hose receiving recess 18, and an oiling passage 19 communicating the protrusion 17 with the recess 18 as shown in FIG. 4a. The inlet side hose support 20 is further formed with a mounting portion 20A having external threads which are to be screwed into the fitting yoke 7 (FIG. 5). The inlet side hose support 20 may be made of brass, aluminum alloy or steel.

Figure 4B:
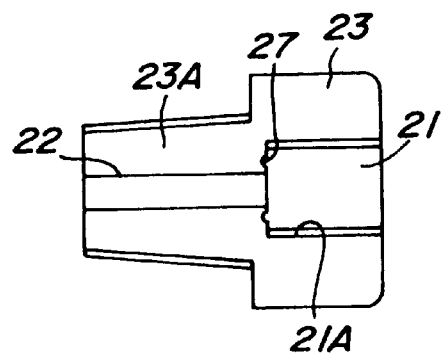

In the embodiment shown in FIG. 3, moreover, the hose mounting portion of partition wall means is composed of an outlet side hose support 23 adapted to be fixed to the partition wall 16 on the side of the proximal end as shown in FIG. 5. The outlet side hose support 23 is formed with a hose receiving recess 21 and an oiling passage 22 communicating the recess 21 with the grease reserving space 8A as shown in FIG. 4b. The outlet side hose support 23 is further formed with an anchoring portion 23A having external threads which are to be screwed into the partition wall 16 on the side of the proximal end (FIG. 5), thereby communicating the oiling passage 22 with the oil hole 9 of the partition wall 16. The outlet side hose support 23 may be made of brass, aluminum alloy or steel.

Figure 4C:
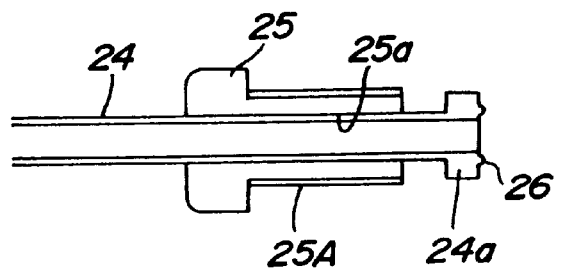

Furthermore, the oiling conduit means is composed of a hose 24 having radially extending flanges 24a at its both ends which are adapted to be inserted into the hose receiving recesses 18 and 21 of the inlet and outlet side hose supports 20 and 23, respectively, and hose fixing plugs 25 adapted to be fixed into the hose receiving recesses 18 and 21 of the inlet and outlet side hose supports 20 and 23 for anchoring both the ends of the hose 24 in the hose receiving recesses 18 and 21, respectively as shown in FIGS. 4c and 5. Preferably, the hose receiving recesses 18 and 21 are formed with internal threads 18A and 21A, and the hose fixing plugs 25 are formed with external threads 25A so that the hose fixing plugs 25 can be fixed in the hose receiving recesses 18 and 21 by threaded engagements. The inner diameter of the hose 24 is substantially equal to the diameters of the oiling passages 19 and 22.

The hose fixing plug 25 is further formed with a hose passing hole 25a through which the hose 24 extends. As described above, the hose 24 includes at each end the flange 24a adapted to engage the end face of the distal end of the hose fixing plug 25 to prevent it from being removed from the hose 24. This will be achieved in a manner that a pair of hoses each having a flange 24a only at one end are inserted into the respective hose fixing plugs 25, and thereafter the other ends of these hoses having no flange are connected to each other.

The flanges 24a of the hose 24 thus combined with the hose fixing plugs 25 are inserted into the hose receiving recesses 18 and 21 of the inlet and outlet side hose supports 20 and 23 and the hose fixing plugs 25 are then screwed into the hose receiving recesses 18 and 21 until the flanges 24a are forced into tight contact with the bottoms of the hose receiving recesses 18 and 21, thereby securely preventing the hose 24 from coming out of the hose supports 20 and 23.

Preferably, an annular protrusion 26 is provided on the end surface of each of flanges 24a at both the ends of the hose 24, while an annular recess 27 adapted to engage to the annular protrusion 26 is correspondingly provided on each of the bottom surfaces of the hose receiving recesses 18 and 21 of the respective hose supports 20 and 23, thereby improving the sealing among the hose 24, the oiling passages 19 and 22 and hose fixing plugs 25. As an alternative, instead of the annular protrusion 26 on the end surface of the flange at the end of the hose 24, an annular recess may be provided in the end surface of the flange, while an annular protrusion may be correspondingly provided on the bottom of the hose receiving recess of the hose support.

Although the tubes 1 and 2 in the form of the butterfly as those of the modified cross-section are shown in the above embodiments, it is to be understood that without limiting it to the butterfly any other shapes of modified cross-section may be applicable to the invention, for example, as a lemon or star-shaped cross-section.

According to the invention, grease is filled through a hose in the grease reserving space defined by the container 8 in the embodiment shown in FIGS. 1 and 2 or by the partition walls 16 in the embodiment shown in FIG. 3. The amount of the grease reserved in the grease reserving space is sufficient to supply the grease to the portions participating in the torque transmission in a stable and durable manner through the distribution passage means, thereby ensuring the complete lubrication of the portions participating in the torque transmission for a long period of time without requiring frequent replenishment of grease. The lubrication on the torque transmission portions accomplished by the invention reduces the thrust or frictional resistance and noise when the driving shaft is rotating and considerably prolongs the service life of the tubes of the modified cross-section.

Moreover, with the hose mounting portion formed as an elongated projection enabling the hose to be fixed thereto by press-fitting in the embodiment shown in FIGS. 1 and 2, or with the hose mounting portion composed of the outlet side hose support 23 and further the inlet side hose support 20, the flanged hose 24 and the hose fixing plugs 25 associated therewith in the embodiment shown in FIG. 3, the hose is surely prevented from being unintentionally removed from that portion. Furthermore, with the mutually engageable annular protrusions and recesses formed on the end surfaces of the hose flanges and bottom surfaces of the hose receiving recesses of hose supports, the tightness in sealing is improved.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A driving shaft comprising an inner tube and an outer tube, each having a modified cross-section, said inner and outer tubes being axially movable but not rotatable relative to each other for transmitting torque between them, a pair of partition walls situated adjacent proximal and distal ends of the inner tube and hermetically sealing at least the inside of the inner tube to define a grease reserving space for grease, a hose mounting portion having an oil hole provided on said partition wall adjacent the proximal end, an oiling port provided on a fitting yoke adjacent the proximal end of the inner tube, an oiling conduit connecting said hose mounting portion and said oiling port, and a distribution passage arrangement for distributing the grease from said grease reserving space to shaped portions of sliding surfaces of said inner and outer tubes which participate in torque transmission, wherein said partition walls are portions of a container made of a plastic material having a cross section similar in shape to that of said inner tube and being of a size such as to be fitted in said inner tube by press-fitting, wherein said hose mounting portion is an elongated projection extending from said partition wall adjacent said proximal end of the inner tube toward said proximal end, wherein said distribution passage arrangement includes a plurality of elongated grooves extending in the longitudinal direction of said container and formed in the side wall of said container corresponding to the shaped portions of said inner tube participating in torque transmission, and wherein a plurality of through-holes are formed in said inner tube to communicate with said elongated grooves.

2. The driving shaft as set forth in claim 1, wherein said container is formed so as to be slightly tapered in its longitudinal direction.

3. The driving shaft as set forth in claim 1 or claim 2, wherein said container is provided with at least one annular protrusion on its outer circumference.

4. The driving shaft as set forth in claim 1 or claim 2, wherein said oiling port includes an inlet side hose support which is fixed to said fitting yoke supporting the proximal end of said inner tube and has an oiling protrusion, wherein a hose receiving recess and an oiling passage communicate said oiling protrusion with said hose receiving recess, wherein said hose mounting portion includes an outlet side hose support which is fixed to said partition wall adjacent the proximal end and has a hose receiving recess and an oiling passage communicating said hose receiving recess with said grease reserving space, and wherein said oiling conduit includes a hose whose both ends are arranged to be inserted into said hose receiving recesses of said inlet and outlet side hose supports, respectively, and have radially extending flanges, respectively, and wherein hose fixing plugs are fixed in said hose receiving recesses of said inlet and outlet side hose supports, respectively, for fixing said both ends of the hose in said receiving recesses, respectively.

5. The driving shaft as set forth in claim 1 or claim 2, wherein said oiling port includes an inlet side hose support which is arranged to be fixed to said fitting yoke supporting the proximal end of said inner tube and has an oiling protrusion, wherein a hose receiving recess and an oiling passage communicate said oiling protrusion with said hose receiving recess, and wherein said hose mounting portion includes an outlet side hose support which is arranged to be fixed to said partition wall adjacent the proximal end and has a hose receiving recess and an oiling passage communicating said hose receiving recess with said grease reserving space, and wherein said oiling conduit comprises a hose whose both ends are to be inserted into said hose receiving recesses of said inlet and outlet side hose supports respectively and having radially extending flanges, respectively, and hose fixing plugs which are able to be fixed in said hose receiving recesses of said inlet and outlet side hose supports, respectively, for fixing said both ends of the hose in said receiving recesses, respectively.

6. The driving shaft as set forth in claim 5, wherein each of said flanges at both the ends of said hose is provided on its end face with an annular protrusion or annular recess, while each of said hose supports is correspondingly provided in the bottom face of the hose receiving recess with an annular recess or annular protrusion engaging said annular protrusion or annular recess.

7. A driving shaft comprising an inner tube and an outer tube, each having a modified cross-section, said inner and outer tubes being axially movable but not rotatable relative to each other for transmitting torque therebetween, a pair of partition walls situated adjacent proximal and distal ends of the inner tube and hermetically sealing at least the inside of the inner tube to define a grease reserving space for grease, a hose mounting portion having an oil hole provided on said partition wall adjacent the proximal end, an oiling port provided on a fitting yoke adjacent the proximal end of the inner tube, an oiling conduit connecting said hose mounting portion and said oiling port, and a distribution passage arrangement for distributing the grease from said grease reserving space to shaped portions of sliding surfaces of said inner and outer tubes which participate in torque transmission, wherein said partition walls are press-fitted in said inner tube, and wherein said distribution passage includes a plurality of through-holes formed in said inner tube at shaped portions participating in torque transmission.

8. The driving shaft as set forth in claim 7, wherein said partition walls are made of a plastic material.

9. The driving shaft as set forth in claim 7 or claim 8, wherein said container is provided with at least one annular protrusion on its outer circumference.

10. The driving shaft as set forth in claim 7 or claim 8, wherein said oiling port includes an inlet side hose support which is fixed to said fitting yoke supporting the proximal end of said inner tube and has an oiling protrusion, wherein a hose receiving recess and an oiling passage communicate said oiling protrusion with said hose receiving recess, and wherein said hose mounting portion includes an outlet side hose support which is fixed to said partition wall adjacent the proximal end and has a hose receiving recess and an oiling passage communicating said hose receiving recess with said grease reserving space, and wherein said oiling conduit includes a hose whose both ends are arranged to be inserted into said hose receiving recesses of said inlet and outlet side hose supports, respectively, and have radially extending flanges, respectively, and wherein hose fixing plugs are fixed in said hose receiving recesses of said inlet and outlet side hose supports, respectively, for fixing said both ends of the hose in said receiving recesses, respectively.

11. The driving shaft as set forth in claim 7 or claim 8, wherein said oiling port includes an inlet side hose support which is arranged to be fixed to said fitting yoke supporting the proximal end of said inner tube and has an oiling protrusion, wherein a hose receiving recess and an oiling passage communicate said oiling protrusion with said hose receiving recess, and wherein said hose mounting portion includes an outlet side hose support which is arranged to be fixed to said partition wall adjacent the proximal end and has a hose receiving recess and an oiling passage communicating said hose receiving recess with said grease reserving space, and wherein said oiling conduit comprises a hose whose both ends are to be inserted into said hose receiving recesses of said inlet and outlet side hose supports respectively and having radially extending flanges, respectively, and hose fixing plugs which are able to be fixed in said hose receiving recesses of said inlet and outlet side hose supports, respectively, for fixing said both ends of the hose in said receiving recesses, respectively.

12. The driving shaft as set forth in claim 11, wherein each of said flanges at both the ends of said hose is provided on its end face with an annular protrusion or annular recess, while each of said hose supports is correspondingly provided in the bottom face of the hose receiving recess with an annular recess or annular protrusion engaging said annular protrusion or annular recess.

\* \* \* \* \*